United States Patent Office 3,005,688
Patented Oct. 24, 1961

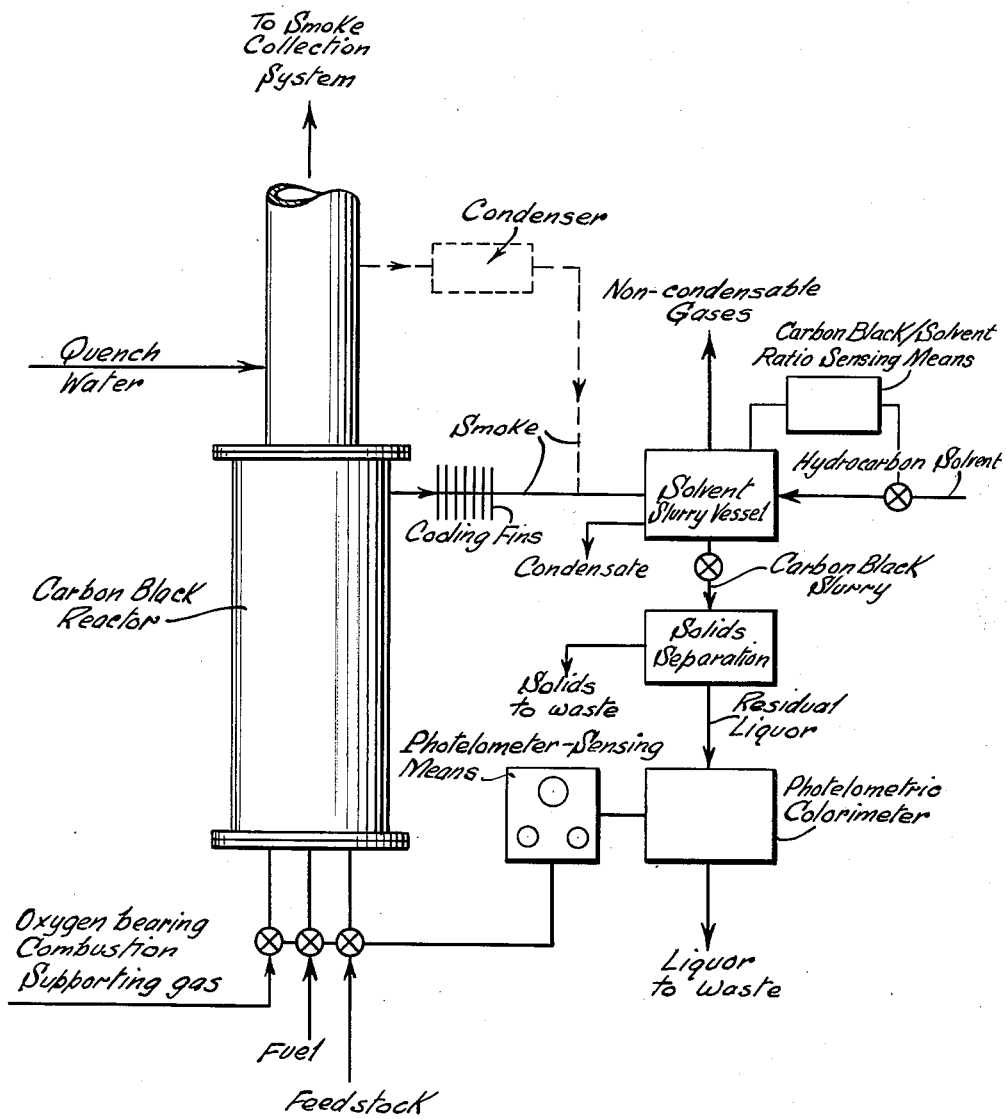

3,005,688
CARBON BLACK REACTOR CONTROL SYSTEM
David Charles Williams, Aransas Pass, Tex., assignor to United Carbon Company, Inc., Houston, Tex., a corporation of Maryland
Filed July 15, 1960, Ser. No. 43,058
3 Claims. (Cl. 23—259.5)

This invention relates to carbon black. More particularly, it relates to a system associated with a carbon black reactor for controlling the reaction occurring within the said reactor. Still more particularly, it relates to a system for automatically controlling a carbon black reaction by a continuous measurement of the photelometer of the carbon black produced.

The preparation of furnace carbon blacks by thermal decomposition of a gaseous or liquid hydrocarbon is well known. In general, this method of preparation comprises decomposing a hydrocarbon by the heat generated from the burning of a portion of the hydrocarbon and/or decomposing the hydrocarbon by subjecting it to heat generated by the substantially complete combustion of a second, and generally different, hydrocarbon. In any particular carbon black reactor employing a particular hydrocarbon feedstock, the uniformity of quality as well as the yield of the carbon black produced are related to the ratios of feed rates of the reactants. Adjustments in the ratio of reactant feed rates during the running of the reaction to maintain quality and yield are usually made on the basis of periodic photelometer tests conducted on the carbon black produced.

Heretofore, a "photelometer reading" has been obtained by slurrying a sample of carbon black in a hydrocarbon solvent such as benzene, toluene, xylene, carbon tetrochloride, chloroform, or the like, agitating and filtering the resultant slurry, and then measuring the color of the filtrate by placing it in a colorimeter test cell of any commercially available colorimeter which has been zeroed against a sample of clear solvent. This color measurement is converted to a light transmission value which is referred to as a photelometer reading, or the "photelometer" of the carbon black. Based on this reading, or photelometer, an operator makes arbitrary adjustments in the ratio of feed rates to the reactor. This trial and error procedure is periodically repeated in an effort to obtain a product giving a desired preselected photelometer reading. While basically being an excellent test for controlling quality and yield, the photelometer test when practiced in this manner is obviously slow and tedious. Moreover, feed rate ratio adjustments, although based on the photelometer, are further based on the judgement of the operator which may vary from time to time. Such adjustments, moreover, lack some further element of accuracy inasmuch as a considerable period of time may elapse from the time of sampling to the time that feed rate ratio adjustments are finally made.

It is apparent, therefore, that a faster, less arbitrary and more accurate system of translating the hydrocarbon solvent extractable content of a carbon black product into adjusted carbon black reactor feed rate ratios is desirable. Accordingly, it is a principal object of this invention to provide such a system. It is a further object of this invention to provide a process for accurately controlling the quality and yield of carbon black produced in a carbon black reactor. It is a still further object of this invention to provide a system which automatically and continuously samples and measures the photelometer of carbon black produced in a reactor. A further object of this invention is to provide a system which automatically controls feed rate ratios to the reactor in response to such photelometer measurements. An additional object is to provide a system for measuring the photelometer and automatically adjusting feed rate ratios in response thereto which requires no unusual equipment, may readily be installed in association with any carbon black reactor and which requires no manual control by operating personnel.

According to this invention, such a system has been simply and effectively devised. In general, the system of this invention continuously and automatically samples carbon black produced in a carbon black reactor, determines it photelometer and translates these values into proper reactant feed rate adjustments. A more detailed description may be readily understood by reference to the accompanying drawing illustrating a diagrammatic representation of the combination of components comprising the system of this invention.

Referring to the drawing, there is shown therein a carbon black reactor provided at its entrance end with means for injecting into the reaction chamber thereof a hydrocarbon feedstock, a hydrocarbon fuel and a combustion-supporting oxygen-bearing gas, usually air. Each of said injection means is provided with flow regulating means any one of which may be provided with means for automatically adjusting the flow therethrough in response to a signal produced in a manner as described below. While the reactor illustrated indicates that all reactants are injected parallel to the axis of the reactor, it should be understood that for the purposes of this invention, the particular means of injection is immaterial and may be variously modified as is well known in the art. At its opposite or exit end, the reactor communicates with a quench zone which in turn communicates with a carbon black-bearing smoke collection system which further communicates with a separation system all of which are common in conventional carbon black producing facilities.

In accordance with this invention, the exit end of the reactor is also provided with a sampling conduit for continuously withdrawing a sample of the carbon black-bearing smoke produced. As illustrated, this conduit may be situated upstream or downstream of the quench zone, the former being preferred, however, since the smoke will contain less water vapor by virtue of not having passed through the quench zone. When situated upstream, it is desirable to provide the conduit with some kind of cooling means such as the atmospheric cooling fins illustrated while, if alternatively located downstream, the conduit should preferably be provided with means for removing water. In addition, the sampling conduit is preferably provided with means for automatic cleaning, such as a high pressure air or gas back-flushing valve. The size of the conduit is such as to continuously conduct a small volume of smoke from the reactor to a solvent slurry vessel provided with means for maintaining a fixed volume of any hydrocarbon solvent normally employed in photelometer testing, such as benzene, toluene, xylene or the like.

The particular form taken by the solvent slurry vessel comprises no part of this invention. An embodiment found unusually satisfactory, however, comprises a vessel which, in addition to smoke inlet means, is also provided with a noncondensable gas discharge means, a condensate discharge conduit, a carbon black slurry discharge means and a hydrocarbon solvent inlet means, the latter being provided with flow regulating means. Also associated with the slurry vessel and operatively connected to the flow regulating means of the solvent inlet means is a carbon black-solvent ratio sensing means responsive to a predetermined carbon black-solvent ratio in the vessel. Additionally, the vessel is preferably provided with agitating means of any conventional design to insure a thorough carbon black in solvent suspension.

In operation of the system of this invention as so far described, carbon black-bearing smoke is continuously withdrawn from the reactor and cause to flow through the sampling conduit to the solvent slurry vessel, the flow being relatively constant due to the fixed size of the conduit. The smoke is introduced into the solvent slurry vessel well below the surface of the solvent, the water vapor content of the smoke condensing and settling to the bottom. The noncondensable gas rises through the solvent and escapes to the atmosphere through a noncondensable gas discharge means. The carbon black content of the smoke, in the form of particles, is suspended in the solvent by constant agitation and, at the same time, is subjected to the extracting action of the solvent. Because of a very pronounced interface existing between the solvent and the water condensed from the smoke, sufficient agitation to insure a thorough suspension of black in solvent may be maintained without disturbing the interface and causing black to disperse in the water phase. The water-solvent interface may be maintained at a constant level by an open condensate discharge conduit discharging at a preselected level. Agitated black-solvent slurry is withdrawn from the slurry vessel as an overflow and further treated as described below.

The previously referred to carbon black-solvent ratio sensing means may take any of various forms without departing from this invention. A particularly suitable embodiment for maintaining a preselected carbon black/solvent ratio is based on a specific gravity of the slurry and comprises a hydrometer or float suspended in the solvent and operatively connected to the solvent inlet flow regulating means through a force balance system. The ratio sensing means is appropriately calibrated to activate the solvent inlet means so as to maintain a predetermined ratio of black to solvent. This ratio may, of course, be varied as desired. A carbon black photelometer reading, however, is usually determined on a slurry comprising 2 parts by weight of black to 50 parts by volume of solvent and it is to such a ratio to which the ratio sensing means is preferably calibrated and made responsive.

Carbon black-solvent slurry overflowing from the solvent slurry vessel is conveyed to a solids separating means which may take any of various forms. While it is feasible to employ an intermittently operated device, the more practical approach is to employ a continuously operating separator. For this purpose, any of various modifications of continuous drum type filtering devices may be satisfactorily employed in which the solvent is caused to flow through the circumferential surface into the interior of a continuously rotating drum while the solids are retained on the outer surface and discharged, in this case, to waste. The residual solvent and its extracted tarry material are then conveyed to the solution cell of a colorimeter of commercially available design, the standard color cell of which has been previously zeroed or standardized with respect to an uncontaminated sample of solvent by the passage of light therethrough. In the same manner, the degree of light transmission through the residual solvent is measured, the difference from the standard being the photelometer reading of the product. This difference is a measure of the tarry material retained on the carbon black which is a function of the feed rate ratios in the reactor.

Associated with the colorimeter is a photelometer sensing means responsive to photelometer readings varying from a preselected normal conveyed to it as electric signals. This normal is based on what is deemed an optimum relative to yield and quality of carbon black to be produced in the reactor. The photelometer sensing means is in turn operatively connected by electronic, pneumatic or other means, to the flow regulating means of one of the reactant injector means. Accordingly, any variation from normal of the electric signal received from the colorimeter by the sensing means is translated into a further impulse which modifies one of the reactant feed rates according to predetermined calibration. The particular feed rate varied will usually depend on the grade of carbon black being produced. Thus, for high grade blacks such as HAF, the feedstock rate will be varied while maintaining the fuel and air rates constant. For lower grade blacks, the air rate will usually be varied while holding the other flows constant.

From the above description, it is believed that the automatic operation of the continuous measuring and control system is apparent. It is to be understood that the invention herein resides in the system or combination of components rather than in the specific structure of any particular component. Suitable components of varying design, therefore, may be incorporated and employed in the system and still be within the intended scope of the invention. It is also apparent that the successive components of the system must be suitably synchronized in order to render the system functional. Such synchronization is well understood by those skilled in the art. The described continuous control system may be employed with each carbon black reactor separately so that it may be operated at optimum quality and yield levels. Alternatively, the system may be employed to control a plurality of reactors.

I claim:

1. A continuous system for measuring photelometer and for maintaining substantially constant quality and yield of carbon black obtained from a carbon black reactor which comprises: a carbon black reactor having entrance and exit ends; plural reactant injector means at said entrance end for injecting hydrocarbon feedstock, hydrocarbon fuel and an oxygen-bearing combustion supporting gas, one of said injector means being provided with flow regulating means responsive to a signal from a photelometer sensing means; a solvent slurry vessel having a non-condensable gas discharge means, a hydrocarbon solvent inlet means provided with a flow regulating means, a carbon black slurry discharge means and a condensate discharge conduit; a sampling conduit for conveying carbon black-bearing smoke from the vicinity of the exit end of said reactor to said solvent slurry vessel; a carbon black/solvent ratio sensing means operatively connected with said solvent slurry vessel responsive to a preselected carbon black/solvent ratio in said vessel and operatively connected to the flow regulating means of said hydrocarbon solvent inlet means; a liquid-solid separator provided with liquid and solid discharge means; means connecting said carbon black slurry discharge means for conveying slurry to said separator; a colorimeter communicating with said separator for determining the photelometer of liquid discharged from said separator; and a photelometer sensing means operatively connected with said colorimeter responsive to the photelometer determined therein, said photelometer sensing means being operatively connected to the flow regulating means of said one reactant injector means.

2. A system according to claim 1 in which said photelometer sensing means is operatively connected to said hydrocarbon feedstock injector means.

3. A system according to claim 1 in which said photelometer sensing means is operatively connected to said oxygen-bearing combustion supporting gas injector means.

References Cited in the file of this patent

UNITED STATES PATENTS 2,587,107    Cade _____ Feb. 26, 1952
2,953,436    Kron _____ Sept. 20, 1960